(12) United States Patent
Barton et al.

(10) Patent No.: US 7,826,912 B2
(45) Date of Patent: Nov. 2, 2010

(54) METHOD AND ASSEMBLY FOR DETERMINING AND/OR PRODUCING A DRIVE OR PARTS FOR A DRIVE AND INTERFACE AND METHOD FOR DETERMINING AN OPERATIONAL RELIABILITY FACTOR SB

(75) Inventors: Peter Barton, Bretten (DE); Roman Schäfer, Bruchsal (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 472 days.

(21) Appl. No.: 11/975,460

(22) Filed: Oct. 19, 2007

(65) Prior Publication Data

US 2009/0024237 A1    Jan. 22, 2009

Related U.S. Application Data

(63) Continuation of application No. 10/492,506, filed as application No. PCT/EP02/09581 on Aug. 28, 2002, now abandoned.

(30) Foreign Application Priority Data

Oct. 11, 2001    (DE) ................ 101 50 034

(51) Int. Cl.
G06F 19/00    (2006.01)
(52) U.S. Cl. .................. 700/97; 700/117
(58) Field of Classification Search .......... 700/90, 700/95, 97, 106, 117
See application file for complete search history.

(56) References Cited

U.S. PATENT DOCUMENTS

| 5,943,245 A | 8/1999 | Melfi et al. |
| 6,198,181 B1 | 3/2001 | Ali et al. |
| 2004/0133404 A1 | 7/2004 | Morita et al. |

FOREIGN PATENT DOCUMENTS

| EP | 1 134 637 | 9/2001 |
| WO | WO 01/61301 | 8/2001 |

OTHER PUBLICATIONS

R.I. Stephens, A. Fatemi, R.R. Stephens, and H.O. Fuchs. "Metal Fatigue in Engineering". Second edition, Wiley Interscience, 2000. Chapter 9, pp. 9-11 and 35-47.
Miltenovic et al. "Calculation of Load capacity of Gears in Random Varying Exploitation Conditions". Facta Universitatis, Series: Mechanical Engineering. vol. 1, No. 7, pp. 798-807. Oct. 2-5, 2000.
http://web.archive.org/web/20010424005609/www.kisssoft.ch/english/manuel/index.html.
http://web.archive.org/web/20010513230816/www.kisssoft.ch/english/manuel/chap15.html.
http://web.archive.org/web/20010513231829/www.kisssoft.ch/english/manuel/chap17.html.
http://web.archive.org/web/20010228210557/www.kiss soft.ch/english/manuel/chap18.html.
http://web.archive.org/web/20010514133643/www.kisssoft.ch/english/manuel/chap23.html.

*Primary Examiner*—Ryan A Jarrett
(74) *Attorney, Agent, or Firm*—Kenyon & Kenyon LLP

(57) ABSTRACT

An interface and method for determining an operational reliability factor $S_B$ for a drive, including gear unit and motor, provided for a load, an operational reliability factor $S_B$ is determined for the drive or its gear unit from a load collective that is at least three-dimensional.

10 Claims, 9 Drawing Sheets

METHOD AND ASSEMBLY FOR DETERMINING AND/OR PRODUCING A DRIVE OR PARTS FOR A DRIVE AND INTERFACE AND METHOD FOR DETERMINING AN OPERATIONAL RELIABILITY FACTOR SB

RELATED APPLICATION INFORMATION

This application is a continuation of U.S. patent application Ser. No. 10/492,506, filed Apr. 12, 2004 now abandoned, which is a national phase of International Application Serial No. PCT/EP02/09581 filed on Aug. 28, 2002, and claims priority to German Patent Application Serial No. 10150034.3 filed on Oct. 11, 2001, the entirety of each of which is incorporated herein by reference thereto.

FIELD OF THE INVENTION

The present invention relates to a method and a system for determining and/or producing a drive or parts for a drive, as well as an interface and a method for determining an operational reliability factor $S_B$.

BACKGROUND INFORMATION

Manufacturers of drives, including converters, electric motors and gear units, usually offer an extensive production series of drives to the customer, from which the customer is able to select the best possible drive for the customer's special application in accordance with the customer's requirements. The application data, including operating modes, operating loads and types of construction, are essential when making a selection. The number of variants able to be offered, taking into account all sizes of such production series, is very extensive, in particular, more than 10,000 or 100,000.

An aspect of the present invention is to permit a more precise, simpler and optimal selection of the drive, e.g., the gear unit, most suitable for the specific application.

SUMMARY

In an example embodiment of the present invention, with respect to the method for determining and/or producing a drive or parts for a drive, the drive is included in a production series that includes at least one size, each size including at least one variant of drives. For each variant of the production series, a value of a variable for quantitatively measuring the overload capability is determined from input and/or transmitted application data and/or data of an input and/or transmitted load collective, e.g., a load collective including a plurality of partial collectives, and only variants are determined and/or produced whose value of the quantitative variable fulfills one condition, e.g., exceeds a critical value or is external. In this context, the lack of design definition in the case of geared motors, primarily in extreme ranges of the standard applications and in servo technology, may be markedly reduced, taking into consideration the overload capability of gear-unit elements, in the endurance-limit range. In an example embodiment, the quantitative variable is an operational reliability factor $S_B$, and only variants are determined and/or produced whose operational reliability factor $S_B$ exceeds the value 1 as the condition. This may provide that a variable is used which represents a quantitative measure for the overload capability, and thus, together with objective criteria, may permit the determination and production of a drive best suited for the application. In particular, a maximum permissible reliability may be specifiable as well, overdimensioning therefore being avoidable. Alternatively, it is also possible to specify a reliability even higher than just the adequate reliability. For example, even the most reliable drive is selectable from the entire production series.

In an example embodiment, in the event that operational reliability factor $S_B$ is greater than 1 for more than one drive, only that variant is determined and/or produced which is the optimal and/or most cost-effective drive for the application, e.g., in accordance with further requirements. The reliability criterion may be used and linked to other criteria such as cost or type of construction, size, geometrical dimensions, etc.

Features with respect to the method for determining an operational reliability factor $S_B$ for a drive, including gear unit and motor, provided for a load are that an operational reliability factor $S_B$ is determined for the drive or at least for its gear unit from a load collective that is at least three-dimensional.

In this context, the lack of design definition in the case of geared motors, primarily in extreme ranges of the standard applications and in servo technology, may be markedly reduced, taking into consideration the overload capability of gear-unit elements, in the endurance-limit range. For this purpose, four-dimensional load collectives may be considered, with whose aid one also attains, inter alia, a precise knowledge of the load from the start-up dynamics. A method characteristic is the consideration of strength in a component-individual manner instead of a general representation of the geared motor as a "black box." Am aspect is, moreover, that the load capacity of the output-shaft components, stressed by lateral forces, is a function of the partial collective and therefore a function of the load. In addition, not only lateral force, e.g., its amount and direction, but also the axial force may be taken into account. Moreover, the method may require only a small amount of computing time and may be easily configurable for the operator. An aspect is also that a quantitative variable, namely, operational reliability factor $S_B$, is determined, and therefore a quantitative evaluation of each drive of the entire production series is usable based on the application or the application data. If the application data change, this quantitative value also changes. Thus, the optimal drive may be determinable individually for each application.

In an example embodiment, at least in the case of the gear unit, for each component j an individual operational reliability factor $S_{Bj}$ is determined, and from this, the minimum of all individual operational reliability factors $S_{Bj}$ is used or determined as operational reliability factor $S_B$ and output and/or displayed for further use in placing orders or for production. A quantitative value may be determinable for each component, and from all these values, a total value may be quantitatively determinable that quantifies the operational reliability of the drive.

In an example embodiment, the load collective may be at least four-dimensional and may include at least information about the time characteristic of the variables torque, speed, axial force and lateral force. In particular, direction and amount or, alternatively, two corresponding components are possible when entering the lateral force. In an example embodiment, even the contact point of the lateral force may be input. This may provide that it is possible to input not only steady-state loads having constant values, but also time characteristics of the real application. In addition, not any imaginary maximum value for the variables, e.g., for the load collective, is used, but rather the effective variable values occurring in the specific partial collective of the load collective. Moreover, even the direction and the amount of the lateral force and/or even the contact point of the lateral force on the specific shaft section may be considered. This may permit a precise determination of the operational reliability factor, even as a function of the lateral-force direction and its contact point. The drive to be produced may be determined far more accurately precisely because a separate value is able to be taken into account for each partial collective. Therefore, e.g., smaller and/or more cost-effective drives may be determined, manufactured and used. In addition, reliability may be markedly increased.

In an example embodiment, input of the operational sign of the axial force, that is, a distinction in tensile force and compressive force, is also permitted, and it is possible to input the power-flow direction when entering the torque. Thus, the real application may be precisely described, e.g., a distinction and correspondingly correct design is made possible in the case of generating and motoring operation. Particularly the speed direction, which produces different states of stress, is able to be input and taken into consideration, as well. Suggestions of variants which exhibit greater operational reliability are also able to be output.

In an example embodiment, the load collective includes numbers of load alternations for the variables as information about the time characteristic. Few characteristic numbers are able to be input and used.

In an example embodiment, the load collective includes partial collectives which are produced by classification, the respective classes including specific value ranges of associated variables. This may provide that the quantity of data belonging to time characteristics may be reduced.

In an example embodiment, a critical-load characteristic curve is determined for each component for a specific partial collective, and with the aid of this critical-load characteristic curve and at least one specifiable variable such as lateral force and/or axial force, a permissible corresponding torque is determined. Actually occurring variables may be replaceable by an imaginary value for permissible corresponding torque, and these torques, together with the actually occurring torque, are able to be processed for determining operational reliability factor $S_B$.

In an example embodiment, shaft sections having different diameters and/or shaft sections having different geometric nonuniformities are considered as separate components. Complex geometric forms may be considered in a simple manner.

In an example embodiment, the critical-load characteristic curve is able to be parameterized by two parameters in a lateral force/torque diagram and/or the critical-load characteristic curve is able to be parameterized by four or five parameters in a lateral force/axial force diagram. A few parameters may be sufficient to describe the critical-load characteristic curve with sufficient accuracy. Therefore, the computing time may be considerably reduced. In particular, even closed solutions—which works only for a particular company's product—for the cutting of curves may be indicated, which may greatly reduce the computing time and may further simplify the method.

In an example embodiment, with the aid of a critical-load characteristic curve in a lateral force/torque diagram, a value for permissible corresponding torque is determined from a value for lateral force. The procedure is analogous for the axial force.

In an example embodiment, with the aid of a critical-load characteristic curve in an axial force/lateral force diagram, a value for permissible corresponding torque is determined from a value for axial force and a value for lateral force. Two realistic occurring variables may be described by an imaginary variable and may be usable for determining operational reliability factor $S_B$.

In an example embodiment, a number of cycles to failure is determined for each partial collective and for each component from the associated predefined number of load alternations, the value for torque and the specific permissible corresponding torque. Each component may be taken into consideration with the real load represented by class values, and nevertheless, the computing time is small.

In an example embodiment, an individual operational reliability factor $$S_{Bj} = \frac{1}{\sum_i \frac{n_i}{N_i}}$$

is ascertained from the respective numbers of cycles to failure and the associated number of load alternations.

In an example embodiment, the entered application data include the temperature of the surroundings, the maximum operating temperature and/or the desired minimum service life of the drive. The influence of the ambient temperature may be taken into account, because the ambient temperature has an effect on the load rating of various gear-unit elements. In particular, the maximum operating temperature is also inputtable, making it possible to determine or manufacture a drive having sufficiently small heat-transfer resistance from the interior of the drive or the interior of the gear unit to the surroundings.

In an example embodiment, the thermal loading capacity of the gear unit is output and/or displayed, e.g., as a thermal limit rating. The thermal limit rating may be comparable to the power needed by the application, and suitable drives may be able to be determined and/or produced accordingly.

Features with respect to the interface for the input and output of data when working with a method as discussed herein are that the interface includes a graphic user interface and/or a data interface for the input and output of data, it being possible to input load-alternation numbers or travel diagrams. Thus, any man/machine interface having device(s) for graphic display is also usable, e.g., a computer with screen, keyboard and mouse. Since the application data include extensive quantities of data, e.g., the time characteristics, the application data are able to be input quickly and easily with low susceptibility to error using the graphic input possibility.

In an example embodiment, travel diagrams may be input graphically, e.g., using a mouse. By dragging with the mouse, curves may be input containing extensive quantities of data, and thus, nevertheless, only a little time may be needed to input data.

In an example embodiment, during the input procedure, the user is guided such that after inputting information about the non-existence of an axial force and/or lateral force, the user is prompted to input only the torque and number of load alternations, and after inputting information about the existence of an axial force and/or lateral force, the user is prompted to input information about the variables axial force, lateral force, torque and number of load alternations, e.g., information about the time characteristics of all variables. The interface for the method may be usable depending on the customer wish and application or also the customer's knowledge about the customer's application.

In an example embodiment,
information about operational values of the variables is acquired for a drive of an installed application in operation, e.g., using sensors for this purpose,
and these values are used as application data or data of the load collective,
and from this, the optimal and/or most cost-effective drive is ascertained and compared to that present in the application.

The interface for the method may be usable depending on the customer wish and application or also the customer's knowledge about the customer's application.

In an example embodiment, the data is able to be input on a first computer that is connectible via Internet and/or other networks, e.g., Intranet, to at least one further computer, the further computer being usable for implementing the method, e.g., also for the placing of orders and the tie-in of the manufacturing facilities. This may provide that the method is not carried out on the first computer. Thus, the customer inputs the customer's application data, e.g., in graphic manner, on the customer's computer using the customer's Internet browser, and then receives a suggestion for the optimal drive from the further computer connected via Internet. The customer may thus need no installation of a program on the customer's computer, may avoid problems associated with that, and may always be offered the newest version of the program belonging to the method. In addition, the supplier of the program may be protected against software piracy.

DETAILED DESCRIPTION

Figure 1:
FIG. 1 illustrates an input mask for input via a keyboard.

In an example embodiment of the present invention, the application data of a drive, e.g., of a geared motor, include data concerning the provided masses, velocities, accelerations, decelerations, forces, torques, powers, geometric data, frictional forces, etc. Also belonging to the application data in the case of special applications is information concerning the service life, ambient temperature and/or operating temperature. Desired information concerning the reliability, such as minimum and/or maximum reliability factor, may also be input.

In an exemplary embodiment of a method and/or a system according to the present invention, a travel diagram and/or application data are first input without information concerning the type of installation or machine.

In an example embodiment, the type of installation or machine is selected first.

The typical application data relevant in each instance for this installation or machine may thereupon be entered. In this context, an aspect is to obtain and/or to employ a quantitative mechanism for determining the drive best suited for the installation or machine. This may be an important component within the framework of planning and/or designing installations or machines.

The selection, i.e., the input of data, as well as the output of data takes place via the system interface. In an exemplary embodiment of the present invention, the system may be implemented using a single computer system. In another exemplary embodiment of the present invention, the system may be implemented by a network of computer systems, such as the entire Internet. In this case, the interface is allocated to a first computer system, and the method is carried out on one or more computer systems that are connected as a network for the exchange of data. It may be provided that the data and/or programs are updated at the location of the manufacturer of the production series of gear units, and the user of the method may only need a graphic interface usable for the input and output of data. For example, in the case of a computer system connected via Internet, a conventional Internet browser may be used. Not only a computer, but also a portable communication device such as a cellular phone or organizer is usable as such a computer system. Therefore, the drive may be determined in many different manners at many different locations. In an example embodiment, a manufacturing facility which manufactures the specific drive is also connected to the indicated connected computer system. Therefore, in designing an application, production of the specific drive may be triggered by entering the application data at any location in the world.

In an exemplary embodiment of the present invention, the type of installation or machine is selected by clicking on a graphic object which characteristically represents the application. On one hand, data may be input via keyboard, and alternatively, via keyboard and mouse. In particular, the altering of graphic representations which are displayed by the display device is also made possible. Instead of keyboard and mouse, other input device(s) are also usable such as, e.g., touch-sensitive screens.

In the method according to an example embodiment of the present invention, using the data of the load belonging to the specific drive, such as geometric data, minimum and maximum masses and moments of inertia provided, and the data for the operation provided such as the provided time characteristics of the speed, the acceleration, the deceleration and/or the torque, the optimum drive is determined utilizing the known data of all drives of the manufacturer's own production series, or drives which may be optimum but implemented in a different manner mechanically are suggested to the user.

To that end, using the data of the drive, the operating data and application data or the data about the load collective explained in greater detail below, an operational reliability factor $S_B$ is determined for each drive of the entire production series. All drives for which operational reliability factor $S_B$ is greater than 1 are suggested as a result to the user, in particular are displayed or output as a data file. From these suggested drives, the user is thereupon permitted to select the optimum drive for the user's special application. In an exemplary embodiment of the present invention, the most reliable drive, thus the drive exhibiting the greatest operational reliability factor, or that which fulfills further conditions input beforehand, such as a necessary construction, a desired orientation, the lowest costs, etc., is selected. In an example embodiment, this drive is then manufactured by a manufacturing facility connected for the data exchange and delivered to the location of the application for installation.

In an exemplary embodiment of the present invention, the values belonging to the application data are specified as static values. However, the application data or a relevant subset thereof are also specifiable as dynamic values, thus, as a function of time. Therefore, the application data or the subset are either input as travel diagrams in the form of a path/time diagram, velocity/path diagram, acceleration/time diagram, acceleration/path diagram or velocity/time diagram, or as variations of torque, axial force, lateral force and/or speed with time. Instead of path, velocity and acceleration, it is also possible to use angle, angular velocity and angular acceleration.

In further exemplary embodiments of the present invention, the planned number of load alternations with respect to value ranges of variables may be input as application data, as well. Thus, in particular, the specific numbers of load alternations with respect to a first, second, and possibly with respect to one or more further ranges of values for torque may be input. Values of one further variable at least are able to be input with respect to each number of load alternations and associated torque. In particular, both the components and the contact point of the lateral force may be input as variables, as well as the axial force. Further variables which may be input are a desired service life, ambient temperature and/or operating temperature.

Data are input with the aid of a graphic user interface, particularly using a mouse. The mouse input may be used for the graphic input of a travel diagram.

An exemplary input mask for input via keyboard is shown schematically in FIG. 1. The values of the variables are input using the keyboard.

Figure 2:
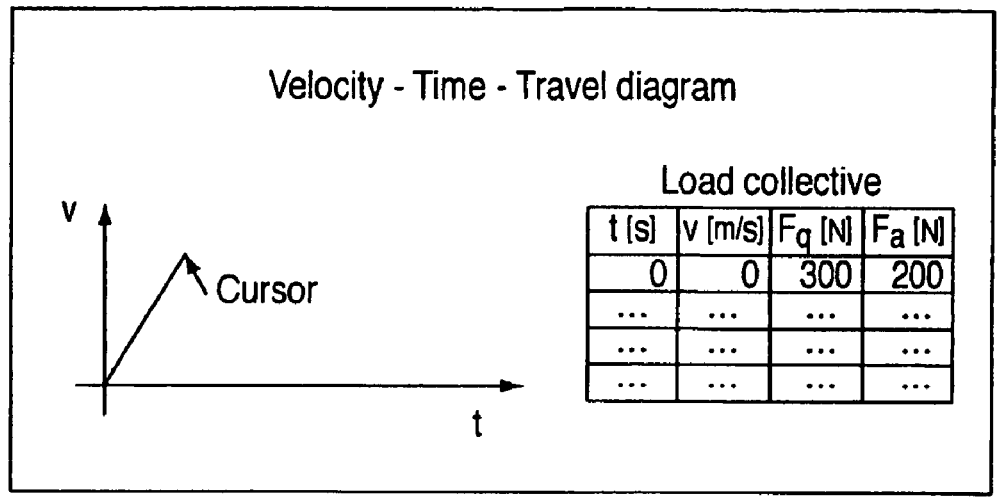
FIG. 2 illustrates an input mask for graphic input.

FIG. 2 shows an exemplary input mask for graphic input using the mouse. In this case, lines are clicked on and then shaped by dragging the mouse. Associated values are displayed in the input mask and altered in accordance with the dragging of the mouse.

In further exemplary embodiments of the present invention, the data may also be input and output via a software interface. Pre-processing and post-processing functions are therefore permitted. In this manner, it is also possible to input real data of an application as a data file, this real data being recorded by measuring device(s) on a drive installed for an existing application.

In the method according to an example embodiment of the present invention, an idealized drive system is used for ascertaining the load from the start-up dynamics.

Figure 3:
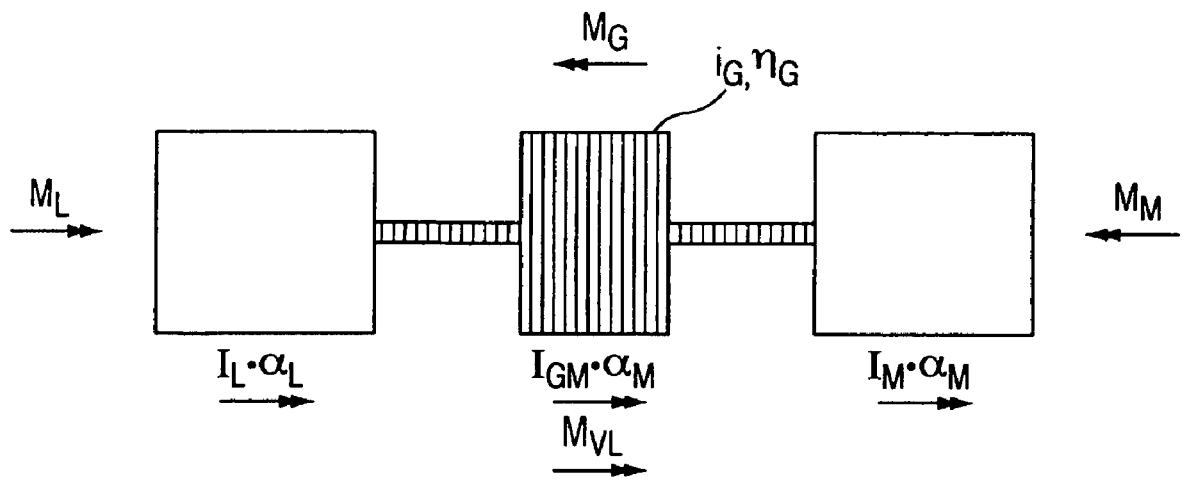
FIG. 3 is a mechanical circuit diagram.

The mechanical circuit diagram of such a system is shown in FIG. 3. Motor torque $M_M$ and mass moment of inertia of the motor $I_M$ are provided for the motor. In the case of the load, load torque $M_L$ and moment of inertia $I_L$ on the load side are characterizing. Gear-unit torque $M_G$ to be transmitted, torque loss $M_{VL}$ of the gear unit specific to the load side and moment of inertia $I_{GM}$ of the gear unit specific to the motor side further characterize the drive. The operating data, angular accelerations $\alpha_L$ and $\alpha_M$, are also features for the drive. The variables gear ratio $i_G$, gear efficiency $\eta_G$, stiffness c and system damping d are also known for each drive. The sought transmitted gear-unit torque $M_G$ for the start-up operation is ascertained from these data by balance-of-moments formation and transformations.

In the method according to an example embodiment of the present invention, each application is characterized by a combination of loads acting on the gear unit according to the operating mode. In this context, a distinction is made between loads in the steady state and in the dynamic state. The state is steady when the speed remains constant. On the other hand, one speaks of a dynamic state when the drive is subject to a speed change.

By classification of the external load, and thus division into value ranges of the associated variable, one obtains a load collective from the real load cycle characteristic. The variables acting on the gear unit are put in order quantitatively.

In this context, in an exemplary embodiment of the present invention, the variables include torques, number of load alternations, lateral force and axial force. Therefore, the associated load collective is able to be characterized by points in a space that is at least four-dimensional. For example, a single point in this representation describes that the corresponding value for torque, the corresponding value for axial force and the corresponding value for lateral force occur with the associated number of load alternations in the application according to the operating data. A specific value range is assigned to each value with the aid of the classification described. Torques which vary within a value range of the classification are regarded as this value belonging to the class. A specific indicated point is also designated in the following as a partial collective.

Figure 4:
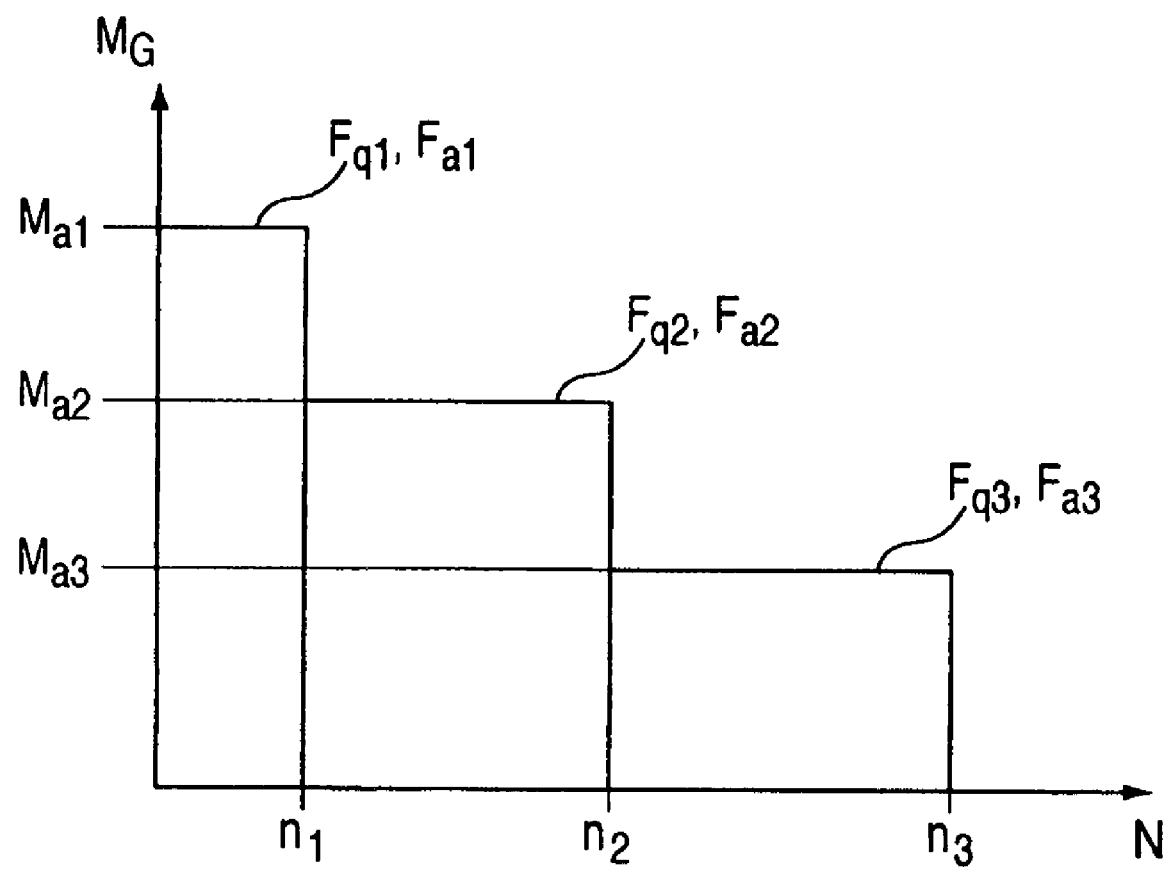
FIG. 4 is a graph that illustrates properties of an application's three associated torques.

In FIG. 4, an application is described during whose operation only three torques occur, i.e., only torques from the three associated value ranges in accordance with the classification. In the application, a start-up torque $M_{a1}$ is provided for a first period of time, a braking torque $M_{a2}$ is provided for a second period of time, and a holding torque $M_{a3}$ is thereupon provided for a third period of time. This procedure is repeated regularly many times, e.g., daily, during the service life, thus, for example, over the course of years. From this, a number of load alternations is able to be derived for the specific torque. In this illustrative application, always only one value of axial force and lateral force lying within a value range belonging to a class occurs for the specific torque. Therefore, these external lateral and axial forces may be added here as attributes to the respective torques, and the representation may be implemented in a two-dimensional manner. The width of the respective partial-collective bar, thus $n_1$, $n_2$ or $n_3$, corresponds to the number of load alternations at the output shaft. Of all variables, only their amounts are used here for the representation in FIG. 4.

In the method according to an example embodiment of the present invention, variables of the four-dimensional load collective input at first, in the case of components stressed by lateral force and/or axial force, are reduced for each partial collective to corresponding variables, e.g., torque. Thus, this corresponding variable does not correspond to the actually operating variable, but makes the method feasible in a simple manner with, simultaneously, little required computing time. In addition, the corresponding variable provides a mechanism for the quantitative stipulation, from which the operational reliability factor may then be determined for the optimized selection of drives from a production series.

Further steps of the method are described by example for the components output-shaft cross-section, output-shaft non-locating bearing, and fixed, floating or pre-loaded output shaft bearings. An analogous procedure is carried out for further components such as the input shaft.

Figure 5:
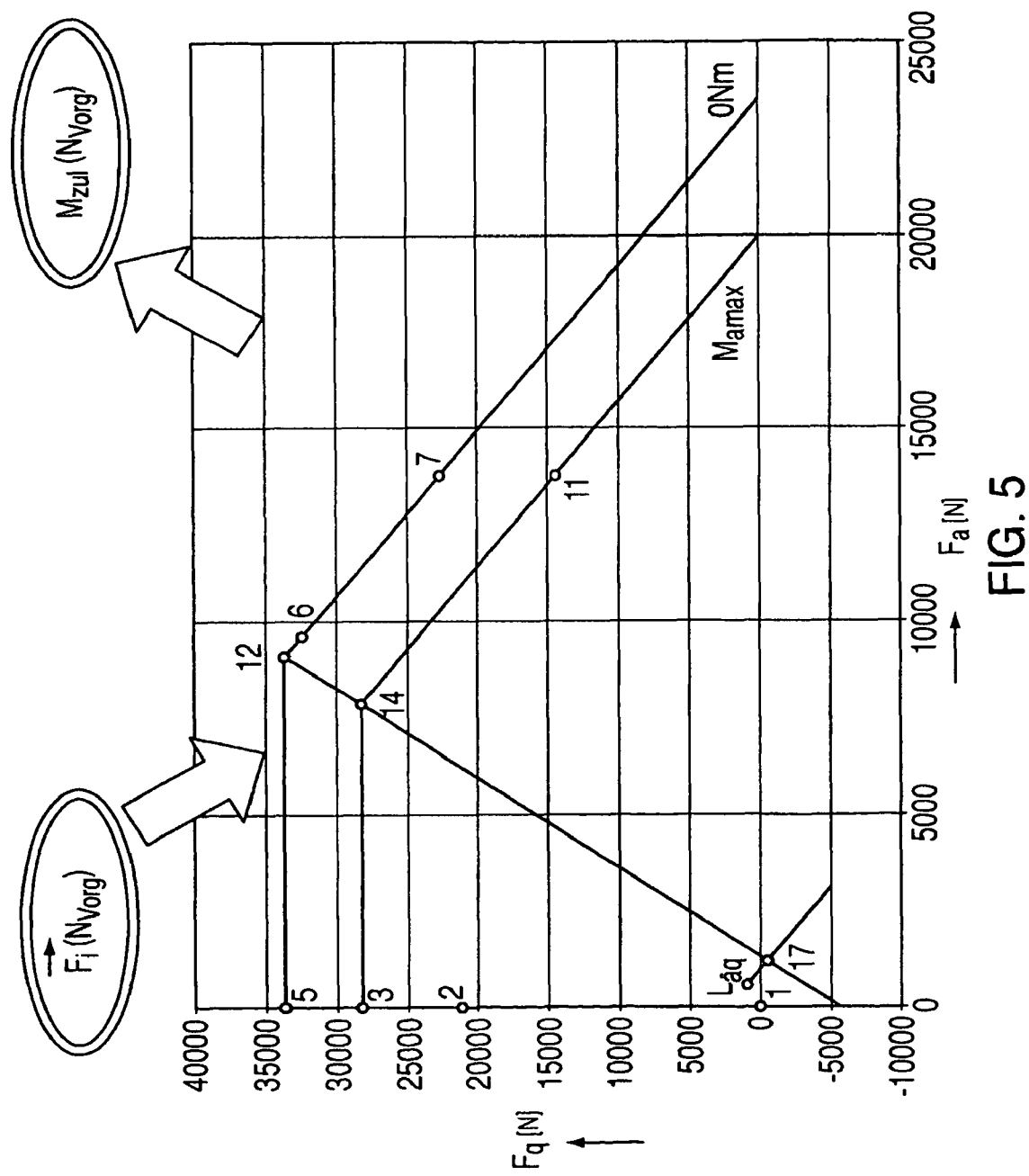
FIG. 5 is a graph that illustrates an ascertainment of a permissible corresponding torque.

In these further method steps, according to FIG. 5, given a predefined number of load alternations, a permissible corresponding torque is determined in each instance for a partial collective from the predefined number of load alternations and the associated axial force and/or lateral force.

To that end, diagrams according to FIGS. 5, 6, 7 and 8 are created which are calculated with the aid of a very large gear-unit database using the standards, such as DIN 743, known physical equations and data from bearing manufacturers.

In this context, a feature is that in the method, a closed representation is used for describing the corresponding critical load for a partial collective for one component.

For a more precise explanation, this procedure is clarified for three following components which are considered when taking axial and lateral forces derived from the load into account. An analogous procedure is carried out for further components occurring depending on the drive.

The corresponding critical load for an output shaft is to be described as permissible torque. For that purpose, a critical-load curve is derived with sufficient accuracy from the indicated gear-unit database, using the standards and known physical equations. In so doing, the critical-load curve represented as a lateral force/torque diagram is determined as an ellipse. Only two parameters may be sufficient for characterizing the critical-load curve for the output shaft in the case of a given cross-section Q.

Figure 6:
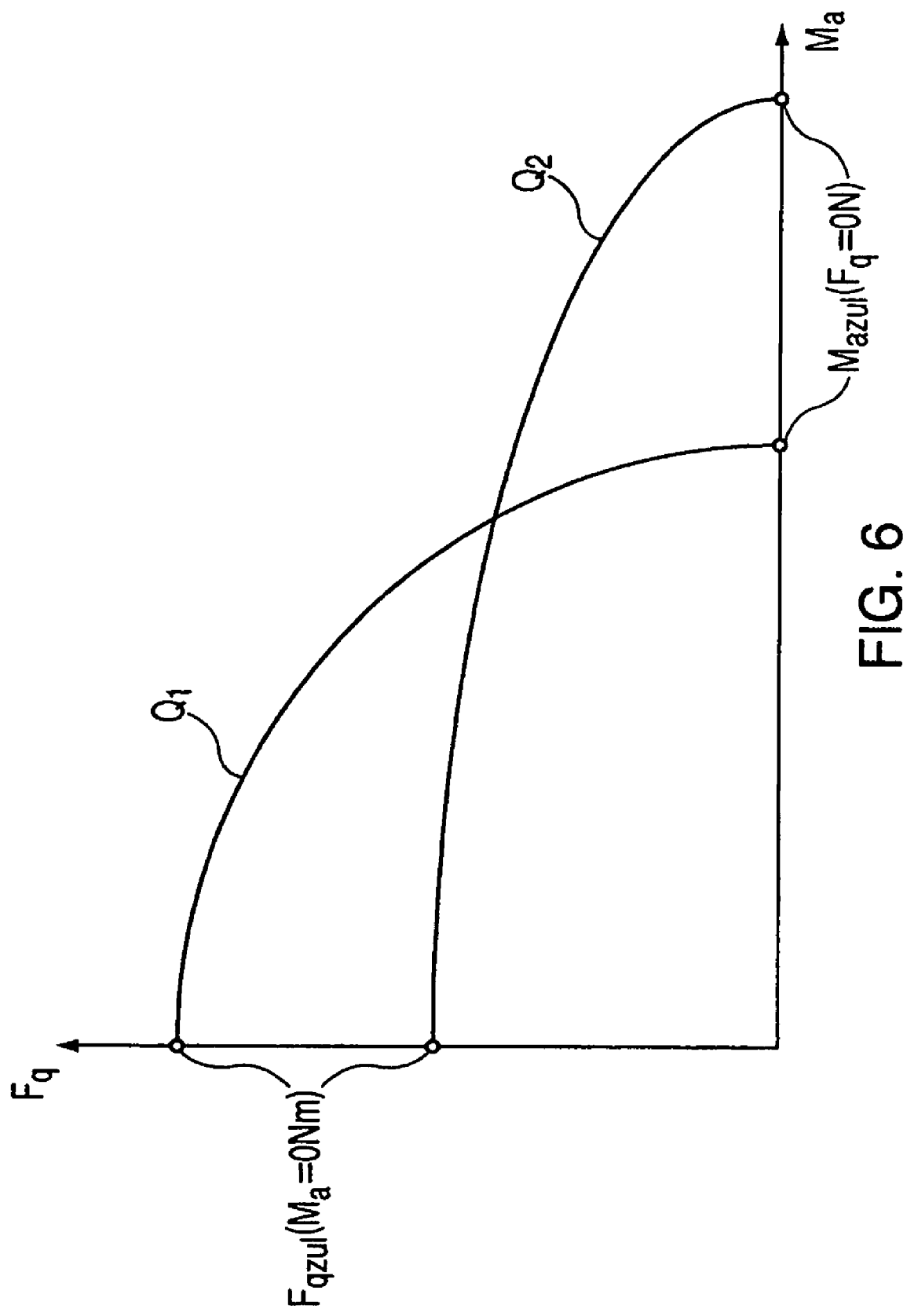
FIG. 6 is a graph that illustrates two critical-load curves plotted as a torque/lateral force diagram.

For an output shaft, a plurality of sections, each having different diameters, or sections having geometric nonuniformities often occur, e.g., up to 18 sections, each having different diameters and a nonuniform offset as transition between the sections. These sections are treated as different components. FIG. 6 shows only two critical-load curves for a first cross-section $Q_1$ and for a further cross-section $Q_2$. In each instance, the critical-load curve is plotted as a torque/lateral force diagram. The critical-load curve here delimits the high-endurance region from the finite-life region. In exemplary embodiments of the present invention, further reliability factors are taken into account that are both deducible from a standard such as DIN 743, DIN 3990, DIN 3996 and the like, and are specifiable by the manufacturer on its own.

Thus, the critical-load curve for an output shaft having an output-shaft cross-section may be described as $$\left(\frac{M_a}{M_{azul}(F_q = 0\,N)}\right)^2 + \left(\frac{F_q(n_i)}{F_{qzul}(M_a = 0\,Nm)}\right)^2 = 1,$$

where $M_a$ is the torque, $M_{azul}(F_q=0N)$ is the permissible torque given a lateral force of 0N, $F_q(ni)$ is the external lateral force of a partial collective, $F_{qzul}(M_a=0\,Nm)$ is the permissible external lateral force given a torque of 0 Nm. Parameters $F_{qzul}(M_a=0\,Nm)$ and $M_{azul}(F_q=0\,N)$ are different for different cross-sections.

From this, the maximum permissible torque for an output shaft having a cross-section is yielded as:

$$M_{azul} = M_{azul}(F_q = 0\,N) \cdot \sqrt{1 - \left(\frac{F_q(n_i)}{F_{qzul}(M_a = 0\,Nm)}\right)^2},$$

where $M_{azul}$ is the permissible torque, $M_{azul}(F_q=0N)$ is the permissible torque given a lateral force of 0N, $F_q(ni)$ is the external lateral force of a partial collective, and $F_{qzul}(M_a=0\,Nm)$ is the permissible external lateral force given a torque of 0 Nm.

In this manner, the permissible torque, also describable as corresponding torque, may be determined from the lateral force. Thus, different values are yielded for this permissible torque depending on the application data or load collective.

An analogous manner of calculating is employed for other components, which in turn has the goal of determining such a permissible torque.

Figure 7:
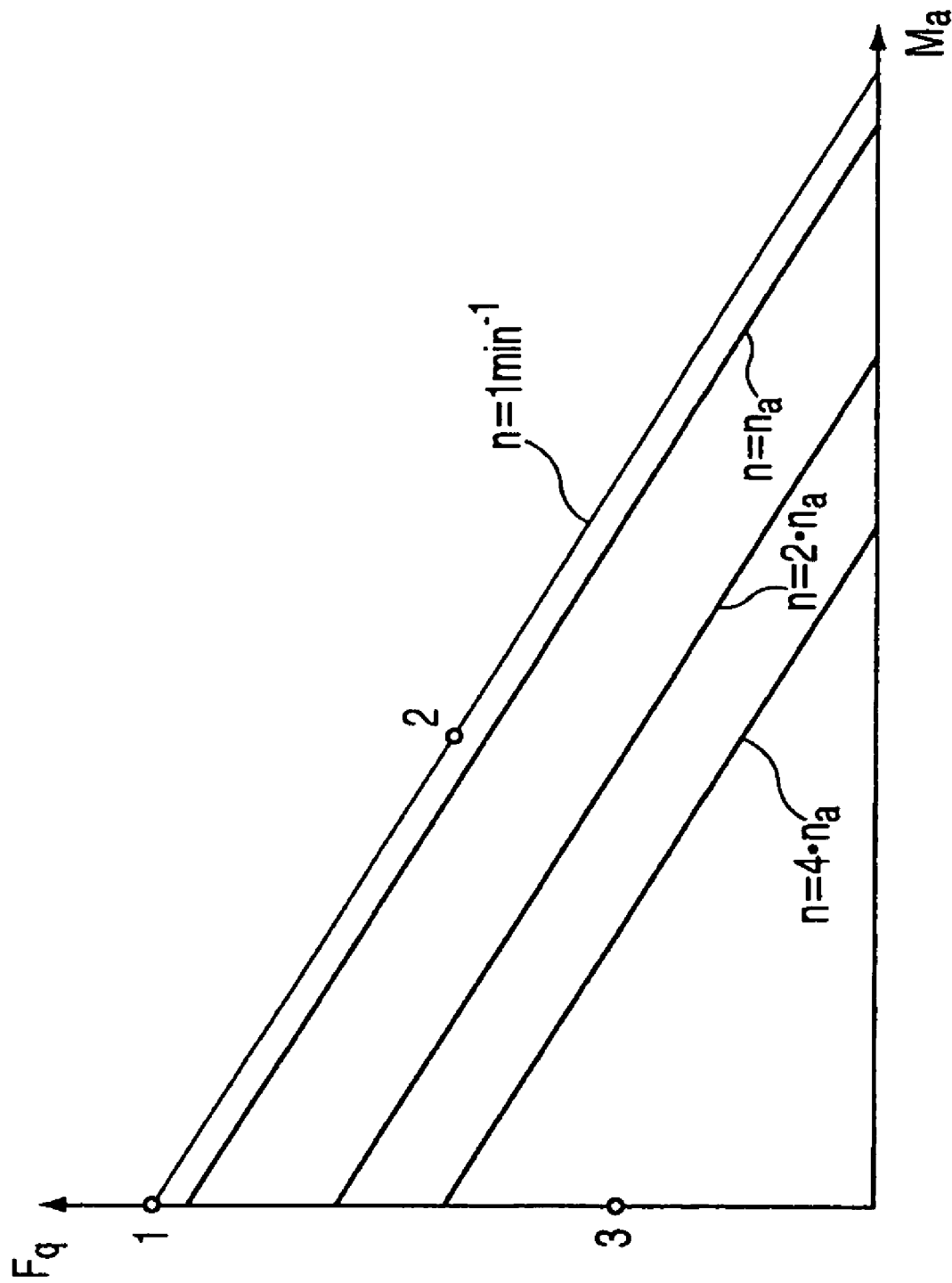
FIG. 7 is a graph that illustrates critical-load curves with straight lines.

As a second example, the calculating method for output-shaft non-locating bearings is now illustrated according to FIG. 7. Critical-load curves are plotted for different output speeds in a torque/lateral force diagram, straight lines being usable in this case. Speed $n_a$ is the standard output speed, thus, the output speed of the gear unit during direct on-line operation. The straight line for $n=1\,\text{min}^{-1}$ describes the absolute load limit. The manufacturers own reliability may be taken into account. A further reduction in speed does not result in any improvement of the load rating.

Permissible torque $M_{azul}$ for a specific speed is ascertained in the following manner:

First of all, a slope m of the critical-load curves is ascertained from the exemplified data characteristic value 1, that is, $(F_{q1}, 0)$, and from the exemplified data characteristic value 2, that is, $(F_{q2}, M_{amax})$, the following equation applying:

$$m = \frac{F_{q2} - F_{q1}}{M_{a\max}},$$

where m is the slope of the critical-load curves, $F_{q1}$ and $F_{q2}$ come from data characteristic values 1 and 2, and $M_{amax}$ is the maximum gear-unit output torque.

The position of the load curve sought is subsequently determined using data characteristic value 1 and using data characteristic value 3, that is, $(F_{q3}, 0)$. Using data characteristic value 3, that is, $(F_{q3}, 0)$, and using bearing-manufacturer data:

$$F_{qn_{aist}} = F_{q3} \cdot \left(\frac{n_0}{n_{aist}}\right)^{\frac{1}{p}} \le F_{q1}$$

is determined, where $F_{qn_{aist}}$ is the permissible lateral force at operating output speed and $M_a=0\,Nm$, $n_{aist}$ is the operating output speed, p is the slope exponent and $n_0$ is the standard speed. The perpendicular distances of the straight lines to the limiting straight line in FIG. 7 increase exponentially.

Finally, permissible torque $M_{azul}$ of the bearing is determined from the two calculated values and the external lateral force:

$$M_{azul} = \frac{F_{qn_{aist}} - F_q(n_i)}{m},$$

where $M_{azul}$ is the permissible torque, $F_{qn_{aist}}$ is the permissible lateral force at operating output speed and $M_a=0\,Nm$, $F_q(ni)$ is the external lateral force of the partial collective and m is the slope of the critical-load curves.

Figure 8A:
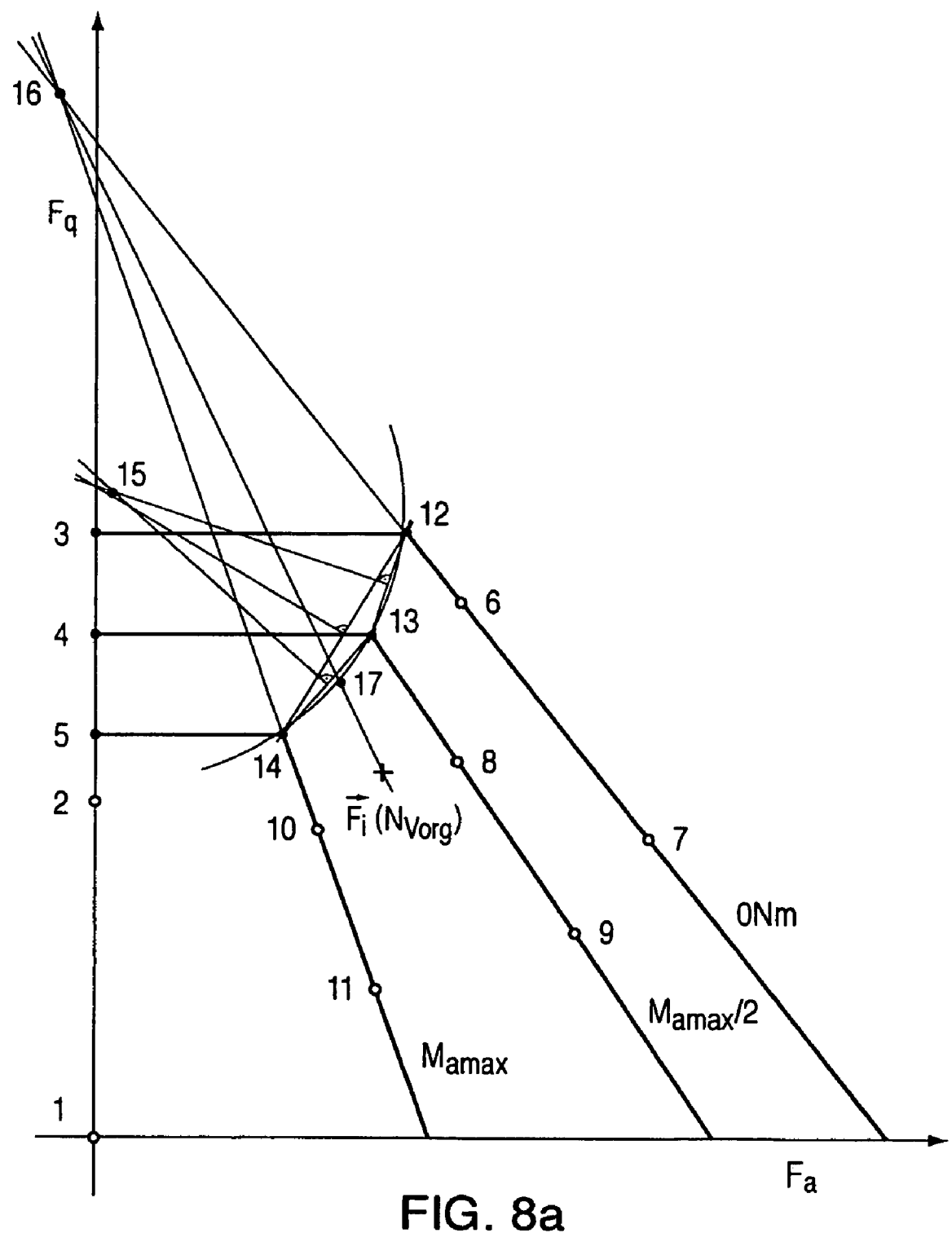
FIG. 8a is a graph that illustrates a calculating method for fixed, floating, or pre-loaded output bearings.

As a third example, the calculating method for fixed, floating or pre-loaded output bearings is illustrated in accordance with FIG. 8a.

The use of a fixed, floating or pre-loaded output bearing may make it necessary to determine permissible torque $M_{azul}$ according to a diagram in accordance with FIG. 8a. The more complicated calculation for a pre-loaded bearing is described first. It is subsequently described, what simplifications result when using a fixed or floating bearing:

From the indicated gear-unit database, points 1, 2, 6, 7, 8, 9, 10, 11 are determined, using the standards and known physical equations. From points 1 and 2, using the known values for the lateral force and torque, points 3 through 5 are obtained by interpolation or extrapolation. They correspond to the lateral-force cover values for $M_a=0$ Nm, $M_a=M_{amax}/2$ and $M_a=M_{amax}$. The intersection of the straight line from points 6 and 7 with the straight cover line through point 3 yields point 12. The procedure is analogous in the case of the values for $M_a=M_{amax}/2$ and $M_a=M_{amax}$, respectively, so that points 13 and 14 are obtained. Point 15 is the center of a circle that goes with sufficient accuracy through points 12 through 14 in adequate approximation. Adequate approximation is to be understood as a tolerance that is less than 10%, but in individual cases, a tolerance of less than 1% may be provided. Next, point 16 is determined as the intersection of the straight lines through points 6 and 7, and points 10 and 11, respectively.

The entire set of characteristic curves in the lateral force/axial force diagram may now be produced, since all corner points of all respective characteristic curves lie on the determined circle having point 15 as its center. This set of characteristic curves conforms with sufficient accuracy to the actual one.

To determine the permissible corresponding torque sought for the partial collective, point $$\vec{F}_i(N_{Vorg})$$

is now marked in in the lateral force/axial force diagram, the point having the values for axial force and lateral force specified for the partial collective.

Subsequently, the straight line through points 16 and this point $$\vec{F}_i(N_{Vorg})$$

intersects with the circular arc which has point 15 as its center. The result is point 17, from whose permissible lateral-force value, permissible corresponding torque $M_{azul}(N_{Vorg})$ is now determined.

Figure 8B:
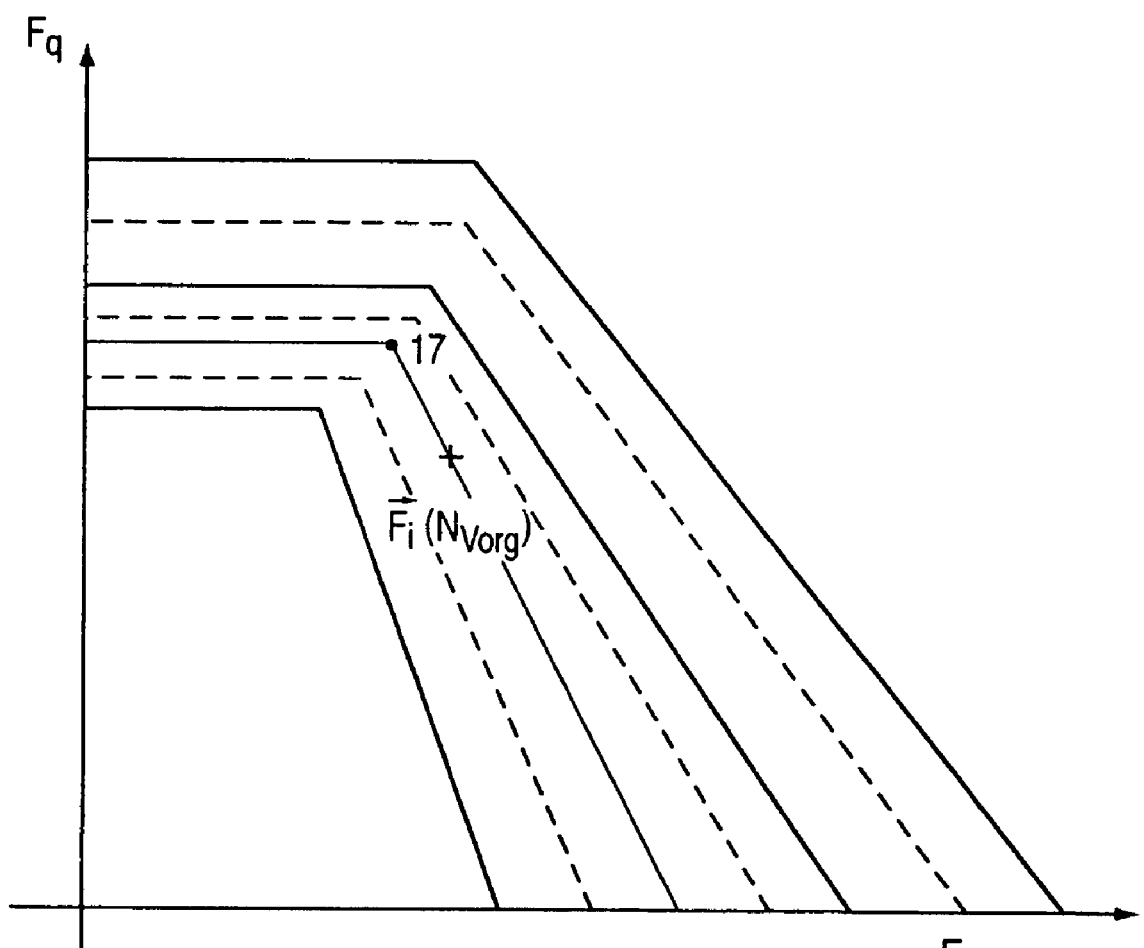
FIG. 8b is a graph that illustrates a set of many densely situated characteristic curves.

In an exemplary embodiments of the present invention, instead of the circle, other non-linear curves having a finite radius of curvature are also usable, which then, however, have more parameters. In example embodiments of the present invention, according to FIG. 8b, the entire set of characteristic curves is stored with a sufficient number of such densely situated characteristic curves, that corner point 17 from FIG. 8b is to be found either directly on a characteristic curve or is determinable by linear interpolation.

When using fixed or floating bearings as components, a diagram according to FIG. 5 is provided. From the indicated gear-unit database, using the standards and known physical equations, it turns out that the falling straight lines through points 6 and 7, 8 and 9, and 10 and 11, respectively, according to FIG. 8a are now parallel in FIG. 5. Points 4, 8, 9, 10, 13, 15 and 16 in FIG. 8a are omitted in the construction of the critical-load characteristic curves. Instead of 5 parameters, 4 now suffice for determining the critical-load characteristic curves, because instead of the circle according to FIG. 8a, a straight line is now usable which, in FIG. 5, goes through points 12 and 14.

Therefore, point 17 is produced by the intersection of the straight line through points 12 and 14 with the straight line parallel to the straight line through points 6 and 7 through point $$\vec{F}_i(N_{Vorg}).$$

Thus, a value for permissible corresponding torque which corresponds to the lateral force and axial force, prevailing in the application, for the corresponding respective partial collective is determinable for fixed or floating bearings in a lateral force/axial force diagram, as well.

If permissible torque $M_{azulD}$ is known, number of cycles to failure $N_i$ as a function of the component and as a function of the partial collective is ascertained. The basic procedure is illustrated in FIG. 9.

Figure 9:
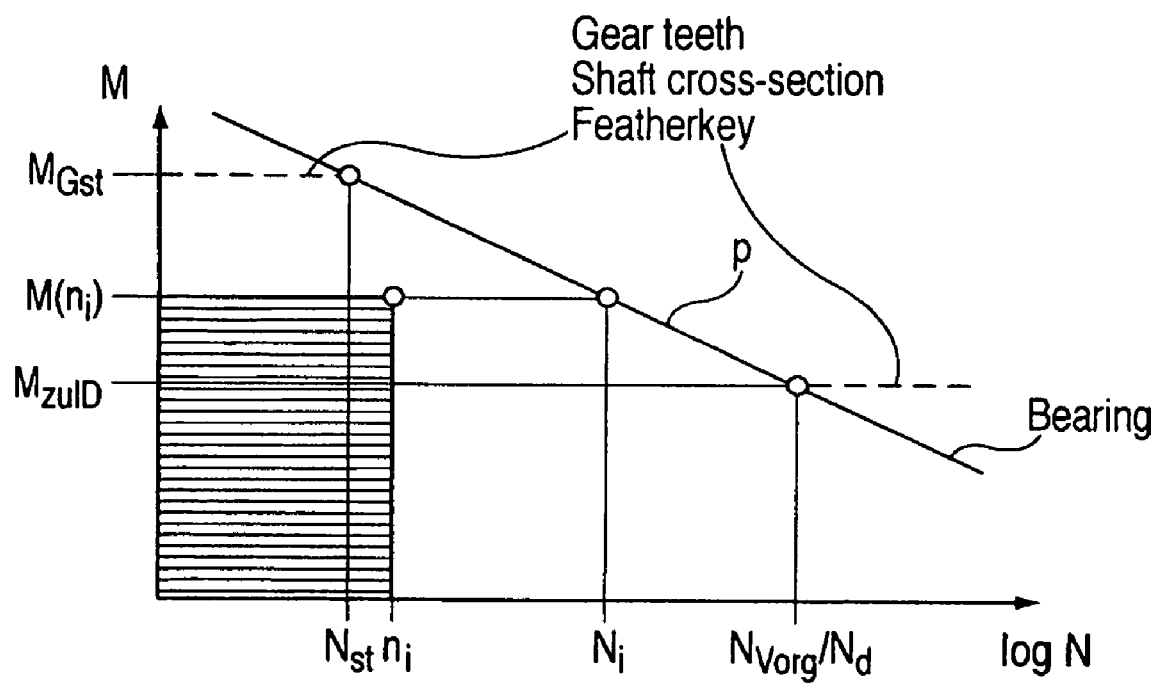
FIG. 9 is a graph that illustrates boundaries that describe static and high-endurance load levels.

In this context, care may be taken that the elements gear teeth, shaft cross-section and featherkey, able to be designed with high endurance, have two boundaries drawn in with a dotted line in FIG. 9. These two boundaries describe the static and high-endurance load level, between which the permissible torque moves.

In between, for the critical load, $$N_i = N_{Vorg} \cdot \left(\frac{M_{azulD}}{M(n_i)}\right)^p$$

where $N_i$ is the number of cycles to failure, $N_{Vorg}$ is the predefined number of load alternations, $M_{azulD}$ is the permissible corresponding torque or damage-accumulation torque, $M(n_i)$ is the torque of the original input partial collective and p is the slope exponent.

With the aid of the numbers of cycles to failure $N_i$, ascertained beforehand for each partial collective, and the existing numbers of load alternations $n_i$, an individual operational reliability factor $S_{Bj}$, which represents a reciprocal damage sum according to Palmgreen-Miner, may be specified for the specific gear-unit element. The describing equation for this, in accordance with the damage-accumulation hypothesis, is $$S_{Bj} = \frac{1}{\sum_i \frac{n_i}{N_i}},$$

where $S_{Bj}$ is the individual operational-reliability factor, $n_i$ is the partial collective number of load alternations, $N_i$ is the number of cycles to failure, i is the number of partial collectives and j is the number of gear-unit elements.

Therefore, the minimum of all calculated individual operational reliability factors $S_{Bj}$ is specified as total operational reliability factor $S_B$. In this context, total operational reliability factor $S_B$ must be greater than or equal to 1:

$$S_B = \text{MIN}_j(S_{Bj}) \geq 1,$$

where
- $S_B$ is the total operational reliability factor,
- $S_{Bj}$ is the individual operational reliability factor, and
- j is the number of gear-unit elements.

What is claimed is:

1. A method for producing one of a drive and drive parts for a drive from a production series of drives, the production series including at least one size, each size including at least one variant of drives, comprising:
   determining a value of a variable for quantitatively measuring an overload capability for each variant of the production series from at least one of input application data, transmitted application data and data of a load collective; and
   manufacturing at least one variant, each manufactured variant having a value of the quantitative variable that fulfills one condition;
   wherein the quantitative variable includes an operational reliability factor $S_B$; and
   wherein only the variants are manufactured having the operational reliability factor $S_B$ that is greater than or equal to 1 as the condition, according to $$S_B = \text{MIN}_j(S_{Bj}) \geq 1.$$

2. The method according to claim 1, wherein the data of the load collective includes data of a plurality of load collectives.

3. The method according to claim 1, wherein the manufacturing step includes manufacturing only the variants having a value of the quantitative variable that one of exceeds a critical value and is at an extreme value of the quantitative variable.

4. The method according to claim 1, wherein the variant manufactured in the manufacturing step is one of:
   at least one of an optimal and a most cost-effective drive for an application; and
   a drive having a longest service life if the operational reliability factor is greater than or equal to 1 for more than one drive.

5. The method according to claim 1, wherein the variant manufactured in the manufacturing step is one of:
   at least one of an optimal and a most cost-effective drive for an application and according to further requirements; and
   a drive having a longest service life if the operational reliability factor is greater than or equal to 1 for more than one drive.

6. The method according to claim 5, wherein the further requirements include geometric requirements.

7. The method according to claim 1, wherein the input application data include at least one of a temperature of surroundings, a maximum operating temperature and desired minimum service life of the drive.

8. The method according to claim 7, wherein the input application data include geometric boundary conditions.

9. A system for at least one of determining and producing one of a drive and drive parts for a drive from a production series of drives, the production series including at least one size, each size including at least one variant of drives, comprising:
   an arrangement configured to determine a value of a variable for quantitatively measuring an overload capability for each variant of the production series from at least one of input application data, transmitted application data and data of a load collective;
   an arrangement configured to manufacture at least one variant, each manufactured variant having a value of the quantitative variable that fulfills one condition; and
   an arrangement configured to calculate an operational reliability factor $S_B$ for the drive;
   wherein the quantitative variable includes the operational reliability factor $S_B$; and
   wherein only the variants are manufactured having the operational reliability factor $S_B$ that is greater than or equal to 1 as the condition according to $$S_B = \text{MIN}_j(S_{Bj}) \geq 1.$$

10. A computer-readable storage medium storing a set of instructions executable by data processing equipment to perform a method for at least one of determining and producing one of a drive and drive parts for a drive from a production series of drives, the production series including at least one size, each size including at least one variant of drives, the method including the steps of:
   determining a value of a variable for quantitatively measuring an overload capability for each variant of the production series from at least one of input application data, transmitted application data and data of a load collective;
   manufacturing at least one variant, each manufactured variant having a value of the quantitative variable that fulfills one condition;
   determining a quantitative value for each variant of the production series from data at least one of inputtable into and transmitted to the data processing equipment; and
   determining an operational reliability factor $S_B$ for one of the drive and the parts of the drive;
   wherein the quantitative variable includes the operational reliability factor $S_B$; and
   wherein only the variants are manufactured having the operational reliability factor $S_B$ that is greater than or equal to 1 as the condition according to $$S_B = \text{MIN}_j(S_{Bj}) \geq 1.$$

* * * * *